United States Patent
Sheng et al.

(10) Patent No.: US 7,724,401 B2
(45) Date of Patent: May 25, 2010

(54) IMAGE SCANNER HAVING WIRELESS CARRIAGE MODULE

(76) Inventors: Kung-Cho Sheng, No. 669, Ruey Kuang Road, Taipei (TW) 114; Hung-Tse Lin, No. 669, Ruey Kuang Road, Taipei (TW) 114; Hsi-Yu Chen, No. 669, Ruey Kuang Road, Taipei (TW) 114

( * ) Notice: Subject to any disclaimer, the term of this patent is extended or adjusted under 35 U.S.C. 154(b) by 1386 days.

(21) Appl. No.: 11/124,976

(22) Filed: May 9, 2005

(65) Prior Publication Data
US 2006/0001916 A1   Jan. 5, 2006

(30) Foreign Application Priority Data
Jul. 1, 2004   (TW) .............................. 93119912 A

(51) Int. Cl.
*H04N 1/04* (2006.01)
*H04N 1/00* (2006.01)

(52) U.S. Cl. ........................................ 358/474; 358/1.6

(58) Field of Classification Search ................ 358/474, 358/476, 1.1, 1.6, 1.15, 1.14, 475, 477, 478, 358/480, 482, 483, 484, 486, 487, 489, 491, 358/493, 494, 496, 497, 498; 382/312, 313, 382/314, 315, 318, 319, 321, 193; 399/1, 399/4, 7, 32, 151, 200, 202, 211; 250/334, 250/227.26; 235/462.32, 462.47, 470; 347/2, 347/3, 5, 224, 225; 355/81, 84
See application file for complete search history.

(56) References Cited

U.S. PATENT DOCUMENTS

| | | | | |
|---|---|---|---|---|
| 4,343,223 | A | * | 8/1982 | Hawke et al. ..................... 89/8 |
| 5,172,243 | A | * | 12/1992 | Hayashi et al. ............. 358/400 |
| 6,040,572 | A | * | 3/2000 | Khovaylo et al. ........... 250/235 |
| 6,344,906 | B1 | * | 2/2002 | Gatto et al. .................. 358/443 |
| 2002/0196478 | A1 | | 12/2002 | Struble |
| 2004/0227979 | A1 | * | 11/2004 | Chen .......................... 358/474 |
| 2004/0262397 | A1 | * | 12/2004 | Khovaylo .............. 235/462.43 |

* cited by examiner

*Primary Examiner*—Dov Popovici
(74) *Attorney, Agent, or Firm*—Workman Nydegger

(57) ABSTRACT

An image scanner having wireless carriage module is provided to overcome the abrasion problem occurred between the flat flexible cable and the transparent scanning platform. The image scanner includes a casing; a carriage module disposed inside the casing for picking up image data of an object to be scanned and converting the image data into digital data; a wireless transmitter incorporated into the carriage module for receiving and modulating the digital data into wireless signals and transmitting the wireless signals out; and a wireless receiver separate from the carriage module and being in communication with a processing system for receiving and demodulating the wireless signals from the wireless transmitter into the digital data and outputting the digital data to the processing system for further processing.

16 Claims, 10 Drawing Sheets

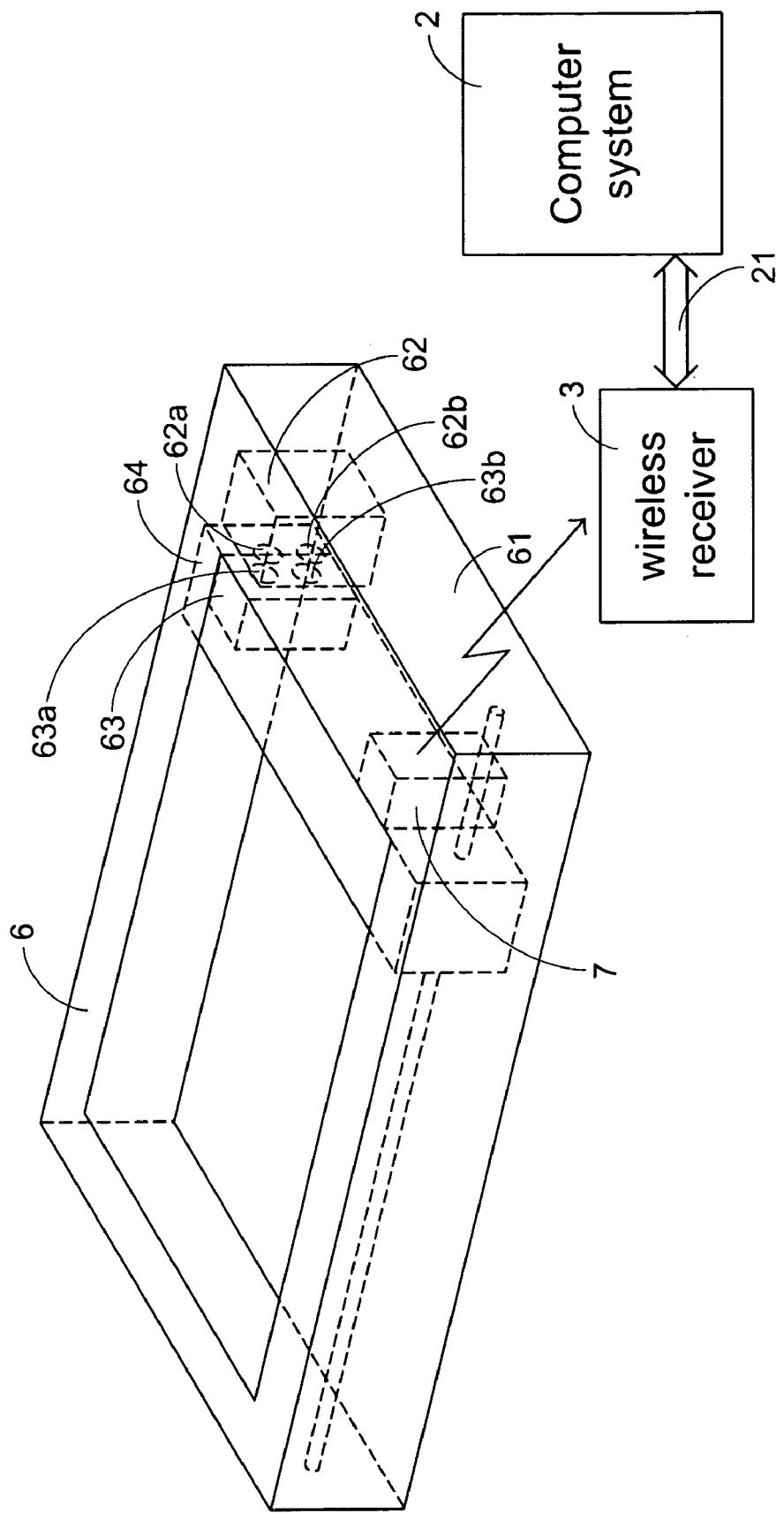

IMAGE SCANNER HAVING WIRELESS CARRIAGE MODULE

FIELD OF THE INVENTION

The present invention relates to an image scanner, and more particularly to an image scanner having a wireless carriage module.

BACKGROUND OF THE INVENTION

A flat flexible cable (FFC) is a common connecting wire between electric devices. It is advantageous to be easily and reversibly bent and stretched in a narrow and crowded space. For example, in a flatbed image scanner, the moving-around carriage module containing therein optical and photoelectric devices is connected with the circuit board through a flat flexible cable. Please refer to FIGS. 1A and 1B which are top and cross-sectional side views, respectively, schematically showing the connecting operation of a flat flexible cable in a flatbed image scanner. The flatbed image scanner 1 includes an upper cover (not shown) and a lower casing 10. In the lower casing 10, a carriage module 11 containing therein optical and photoelectric devices, a driving device consisting of a motor and gear set 121 and a rail set 122, a circuit board 13 including various electronic elements and electrically connected to a computer system 2 via a cable 16, and a flat flexible cable 14 connecting the carriage module 11 with the circuit board 13 are sealed under a transparent scanning platform 15. The carriage module 11 is moved by the motor and gear set 121 along the rail set 122 to pass by and scan a document or picture placed on the transparent scanning platform 15 so as to realize the image data of the document or picture.

Please refer to FIG. 2A which is a schematic cross-sectional diagram showing the structure of a conventional flat flexible cable. The flat flexible cable 14 includes a flexible copper foil 141, an insulating wrapper 142 made of a flexible plastic, and a strengthening plate 143 made of a rigid plastic. The insulating wrapper 142 surrounds the flexible copper foil 141 with two ends of the flexible copper foil 141 exposed for electric contact with the carriage module 11 and the circuit board 13, respectively. The strengthening plate 143 is mounted onto the end portion of the flat flexible cable 14 to facilitate the insertion of the exposed copper foil into the connecting slot (not shown) of the carriage module 11 or the circuit board 13. Further referring to FIG. 1B again, a portion 145 of the flat flexible cable 14 connecting to the circuit board 13 is fixed on the bottom of the lower casing 10, and another portion 146 connecting to the carriage module 11 is freely bent and stretched along with the movement of the carriage module 11.

During the movement of the carriage module 11, the flat flexible cable 14 keeps on electrically connecting the carriage module 11 with the circuit board 13 for signal transmission. The configuration of the flat flexible cable 14 changes all the time during the movement of the carriage module 11 along a scanning direction indicated by an arrow C. The distant end 144 of the flat flexible cable 14 from the carriage module 11, i.e. the U-turn portion, is likely to rise up to the inner surface of the transparent scanning platform 15, as shown in FIG. 2B, due to the flexible property thereof. Especially for an image scanner using a contact image sensor (CIS) as an image pickup device which requires close contact with the document on the transparent scanning platform 15, the flat flexible cable 14 generally keeps in contact with the inner surface of the transparent scanning platform 15 by a part thereof. For example, at a start position where the carriage module 11 is adjacent to the circuit board 13, the flat flexible cable 14 is bent to have a U-turn point at a position relative to the position A on the transparent scanning platform 15, as shown in the solid line of FIG. 1B. On the other hand, at a scanning position where the carriage module 11 moves away from the circuit board 13, the U-turn position shifts to a position B on the transparent scanning platform 15 along the scanning direction C, as indicated by the dotted line of FIG. 1B. As a result, abrasion is likely to occur due to the contact of the insulating wrapper 142 of the flat flexible cable 14 with the transparent scanning platform 15 and the movement of the contact point from the position A to the position B. In general, the insulating wrapper 142 is made of a thermoplastic plastic material and the transparent scanning platform 15 is made of glass. As known, a general thermoplastic plastic material has a smaller hardness than the hardness of the transparent scanning platform 15, so plastic chips may be generated due to the abrasion of the plastic flat flexible cable 14 and the glass scanning platform 15 so as to adversely affect the scanning quality.

Furthermore, in the above flatbed image scanner, the circuit board 13 is disposed on the bottom of the lower casing 10 and hard to be rearranged because of the physical connection to the carriage module 11 via the flat flexible cable 14. Therefore, the miniaturization of the image scanner, which is a trend of modern scanners, is difficult to be achieved.

SUMMARY OF THE INVENTION

The present invention provides an image scanner having a wireless carriage module, so no flat flexible cable is required any longer.

An image scanner for scanning an object to obtain digital data, comprises a casing; a carriage module disposed inside the casing for picking up image data of the object and converting the image data into digital data; a wireless transmitter incorporated into the carriage module for receiving and modulating the digital data into wireless signals and transmitting the wireless signals out; and a wireless receiver separate from the carriage module and being in communication with a processing system for receiving and demodulating the wireless signals from the wireless transmitter into the digital data and outputting the digital data to the processing system for further processing. The image scanner, for example, can be a sheetfed image scanner or a flatbed image scanner.

According to an embodiment of the present invention, a flatbed image scanner further comprises a power-transmitting medium in electric contact with the carriage module for providing the carriage module with power.

In an embodiment, the power-transmitting medium comprises two conductive rods extending in parallel along the moving direction of the carriage module and penetrating through the carriage module, the two conductive rods having therebetween voltage difference so as to provide electricity for the carriage module.

In an alternative embodiment, the power-transmitting medium comprises two conductive plates fixed to the casing and extending along the moving direction of the carriage module, the two conductive plates having therebetween voltage difference so as to provide electricity for the carriage module. Preferably, the power-transmitting medium further comprises two elastic conductor pieces interfacing between the two conductive plates and the carriage module, respectively for stabilizing the movement of the carriage module and avoiding abrasion of the conductive plates. The two conductive plates, for example, can be arranged at the inner bottom of the casing, the same inner side wall of the casing or opposite inner side walls of the casing.

In an alternative embodiment, the power-transmitting medium comprises a conductive rod and a conductive plate extending along the moving direction of the carriage module and arranged at opposite sides of the carriage module, and there is voltage difference between the conductive rod and the conductive plate so as to provide electricity for the carriage module. The carriage module slidably engages with the conductive rod in a manner that the carriage module keeps in electric contact with the conductive plate while moving along the conductive rod.

According to the present invention, the power-transmitting medium is a power supply for providing the carriage module with power. In an embodiment, the power supply comprises a battery device coupled to and moving with the carriage module for providing electricity for the carriage module and having first exposed contacts; and a charging device fixed on an inner wall of the casing and having second exposed contacts. The first exposed contacts of the battery device are in electric contact with the second exposed contacts of the charging device when the carriage module is in a standby position so as to receive electricity from the charging device when the image scanner is powered on.

For example, the wireless transmitter and the wireless receiver comply with a wireless access protocol selected from the group consisting of Bluetooth, IEEE 802.11b and IrDA.

For example, the wireless receiver is separate from the casing of the image scanner and in communication with the processing system via a universal serial bus (USB) cable or an IEEE 1394 bus cable.

For example, the wireless receiver is mounted inside the casing of the image scanner and in communication with the processing system via a universal serial bus cable (USB) or an IEEE 1394 bus cable.

For example, the wireless transmitter and the wireless receiver are implemented with two wireless transceivers.

BRIEF DESCRIPTION OF THE DRAWINGS

The present invention may best be understood through the following description with reference to the accompanying drawings, in which:

FIG. 3B is a perspective diagram showing another preferred embodiment of a flatbed image scanner according to the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
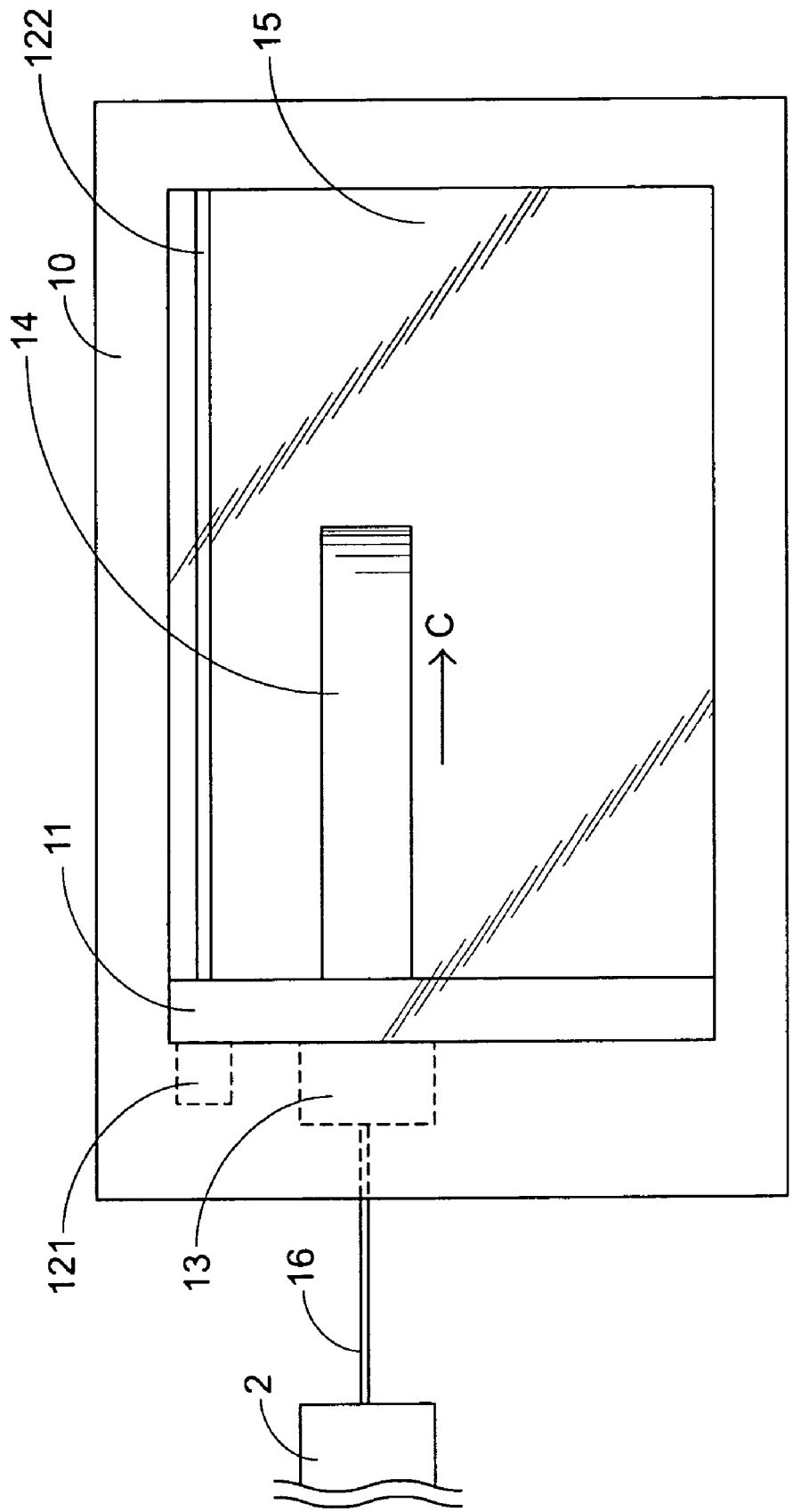
FIGS. 1A and 1B are top and cross-sectional side views, respectively, schematically showing the connecting operation of a flat flexible cable in a flatbed image scanner.
Figure 1B:
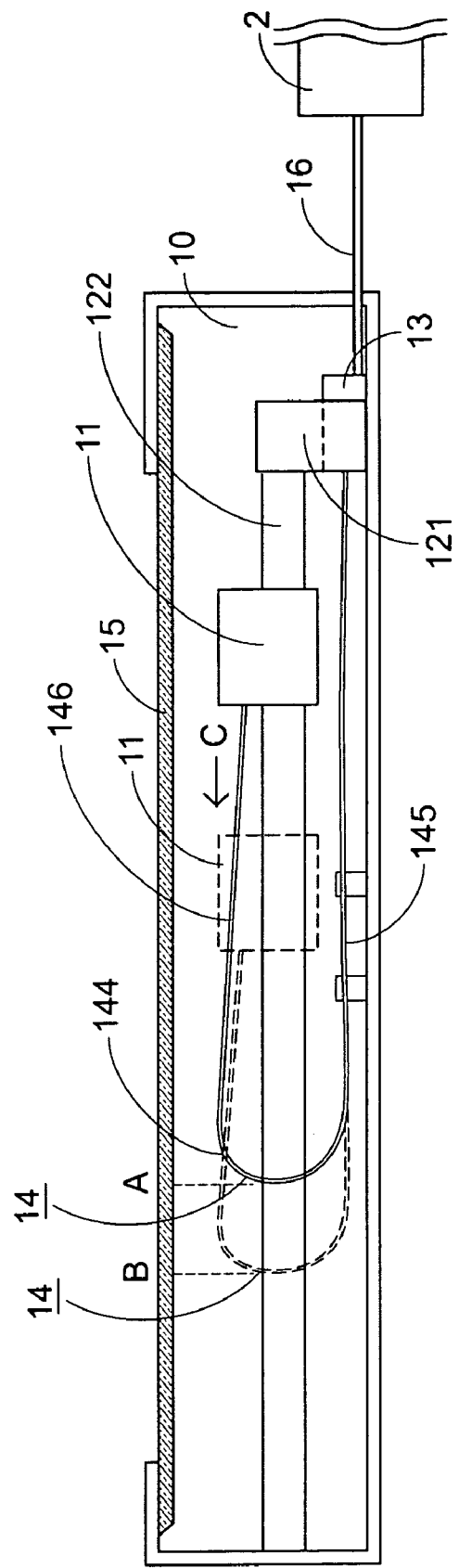
Figure 2A:
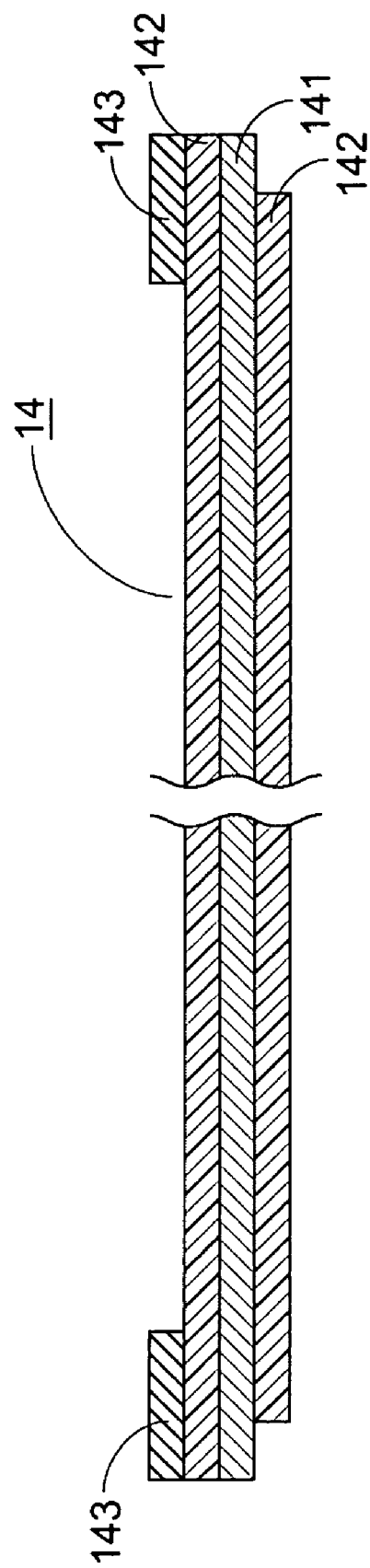
FIG. 2A is a schematic cross-sectional diagram showing the structure of a conventional flat flexible cable.
Figure 2B:
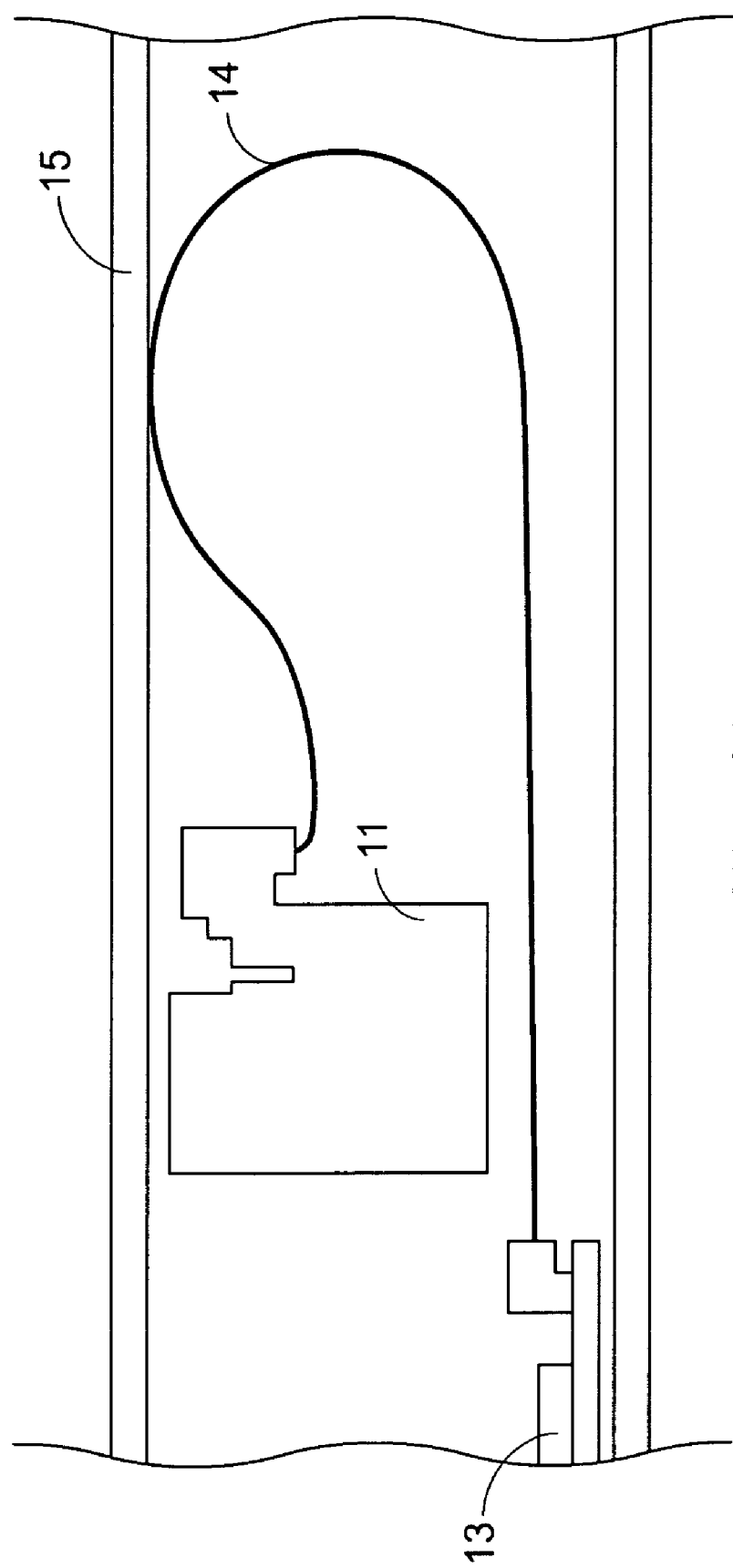
FIG. 2B is a cross-sectional side diagram showing the abrasion occurred between the flat flexible cable and the transparent scanning platform in the flatbed image scanner.
Figure 3A:
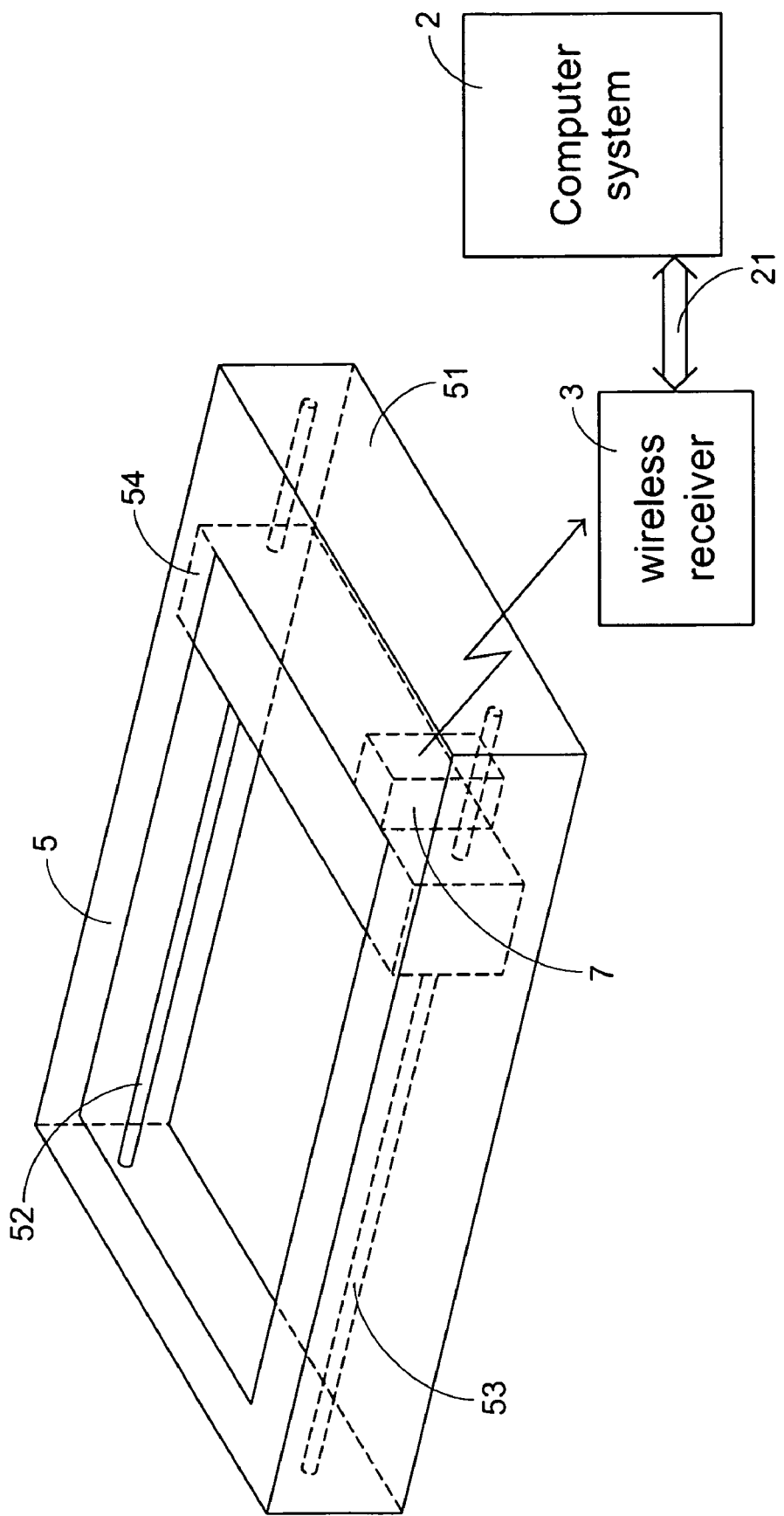
FIG. 3A is a perspective diagram showing a preferred embodiment of a flatbed image scanner according to the present invention.

Please refer to FIG. 3A which is a perspective diagram showing a preferred embodiment of a flatbed image scanner according to the present invention. A processing system is implemented with a computer system 2 in this and subsequent embodiments. The flatbed image scanner 5 includes a cover (not shown) and a lower casing 51 in which a carriage module 54, two conductive rods 52 and 53, and a wireless transmitter 7 is disposed. The wireless transmitter 7 is incorporated into the carriage module 54, and a wireless receiver 3 corresponding to the wireless transmitter 7 is separate from the carriage module 54. The two conductive rods 52 and 53 made of metal extend in parallel along the moving direction of the carriage module 54 and penetrate through the carriage module 54 to be in electric contract with the inner circuits (not shown) of the carriage module 54. The carriage module 54 also slidably engages with and moves along the conductive rods 52 and 53. When the flatbed image scanner 5 is powered on, the two conductive rods 52 and 53 electrically connected to a power source (not shown) have therebetween voltage difference to provide electricity for both the carriage module 54 and the wireless transmitter 7 incorporated into the carriage module 54. While scanning, the carriage module 54 slides along the conductive rods 52 and 53 and picks up image data of the document or picture placed on the transparent scanning platform. The image data is then converted into digital data by the carriage module 54. After the wireless transmitter 7 receives the digital data, it modulates the digital data into wireless signals and transmits the wireless signals out. The wireless receiver 3 located outside the casing 51 receives the wireless signals and demodulating them into the digital data to be outputted to the computer system 2 via a cable 21 such as a universal serial bus (USB) cable or an IEEE 1394 bus cable for further processing. Certainly, the wireless transmitter 7 and the wireless receiver 3 should comply with the same wireless access protocol such as Bluetooth, IEEE 802.11b, IrDA, or any other known wireless transmission standard.

By this way, the conventional flat flexible cable connecting the carriage module to the circuit board is no longer required so the abrasion problem due to the contact between the flat flexible cable and the transparent scanning platform is overcome. Further, the image scanner can be placed according to the user's demand without the restriction of the length of the cable connecting the conventional image scanner and the computer system.

Please refer to FIG. 3B which is a perspective diagram showing another preferred embodiment of a flatbed image scanner according to the present invention. The flatbed image scanner 6 includes a cover (not shown) and a lower casing 61 in which a carriage module 64, a power supply including a battery device 63 and a charging device 62, and a wireless transmitter 7 is disposed. The wireless transmitter 7 is incorporated into the carriage module 64, and a wireless receiver 3 corresponding to the wireless transmitter 7 separate from the carriage module 64 is located outside the casing 61 of the flatbed image scanner 6. The battery device 63 is coupled to and moving with the carriage module 64, and the charging device 62 is fixed on an inner wall of the casing 61. Both the battery device 63 and the charging device 62 have two exposed contacts 63a, 63b, 62a, 62b, respectively. When the flatbed image scanner 6 is powered on and the carriage module 64 is in a standby position, the exposed contacts 63a and 63b of the battery device 63 are in electric contact with the exposed contacts 62a and 62b of the charging device 62. At the moment, the charging device 62 charges the battery device 63 so that the battery device 63 can receive enough electricity for the carriage module 64 and the wireless transmitter 7 to proceed to the following scanning operation. While scanning, the carriage module 64 moves and picks up image data of the document or picture to be scanned. The image data is then converted into digital data by the carriage module 64. After the wireless transmitter 7 receives the digital data, it modulates the digital data into wireless signals and transmits the wireless signals out. The wireless receiver 3 located outside the casing 61 receives the wireless signals and demodulating them into the digital data to be outputted to the computer system 2 via a cable 21 for further processing.

Figure 3C:
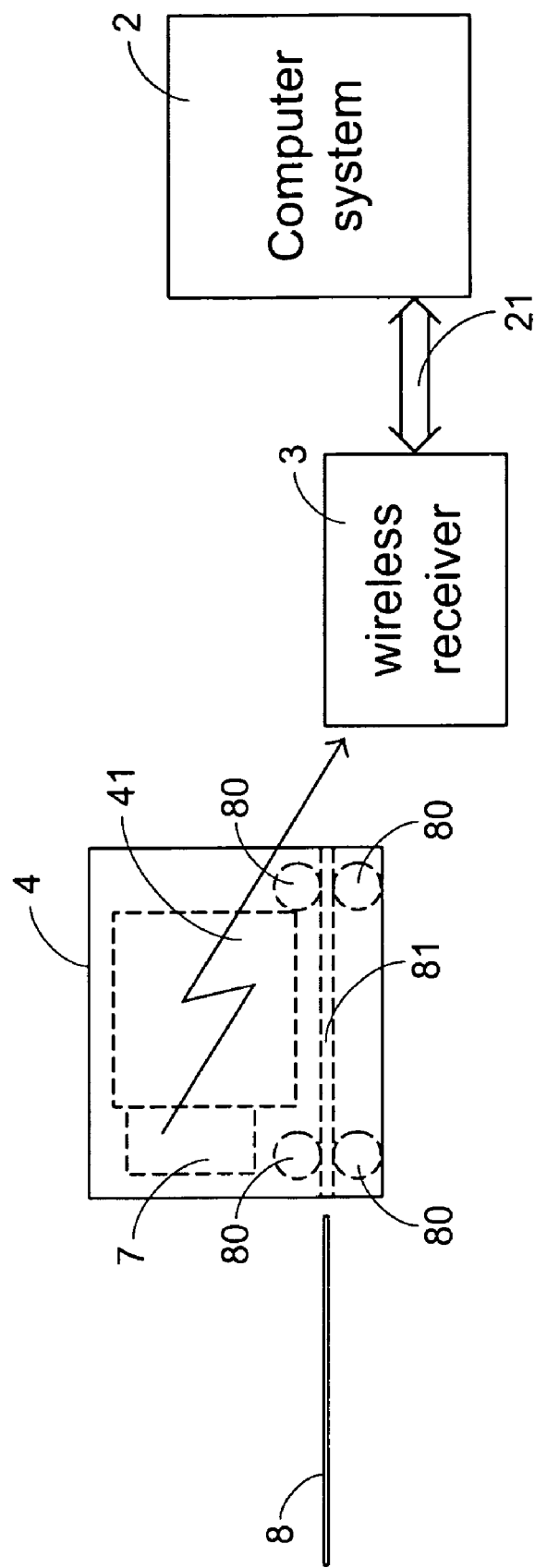
FIG. 3C is a schematic diagram showing a preferred embodiment of a sheetfed image scanner according to the present invention.

In another embodiment, the wireless transmission is applied to a sheetfed image scanner 4. Please refer to FIG. 3C which is a schematic diagram showing a preferred embodiment of a sheetfed image scanner according to the present invention. The wireless transmitter 7 is incorporated into the carriage module 41 and the corresponding wireless receiver 3 is separate from the carriage module 41. While scanning, the document or picture 8 to be scanned is fed into the sheetfed image scanner 4 and transported by the rollers 80 to pass the scanning passage 81. The fixed carriage module 41 picks up image data of the moving document 8 and converts the image data into digital data. After the wireless transmitter 7 receives the digital data, it modulates the digital data into wireless signals and transmits the wireless signals out. The wireless receiver 3 receives the wireless signals and demodulating them into the digital data to be outputted to the computer system 2 via a cable 21 for further processing.

Figure 4A:
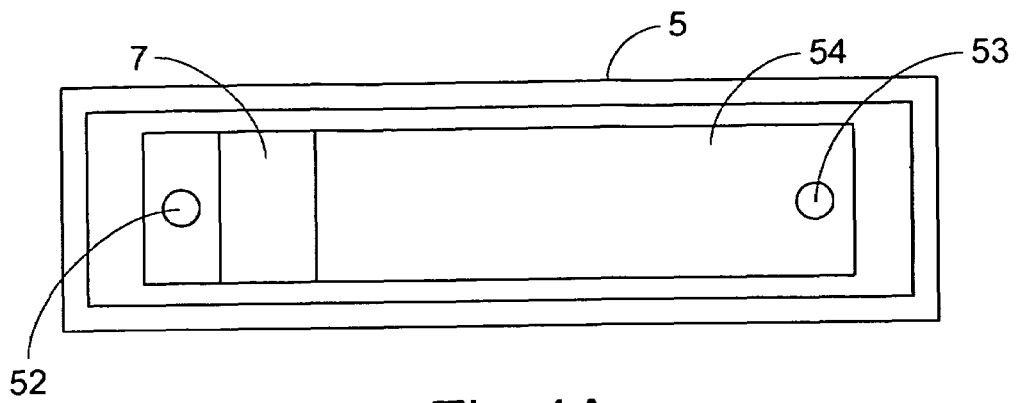
FIGS. 4A~4C are schematic diagrams showing three preferred embodiments of power-transmitting method for providing the wireless carriage module of the flatbed image scanner with power according to the present invention.
Figure 4B:
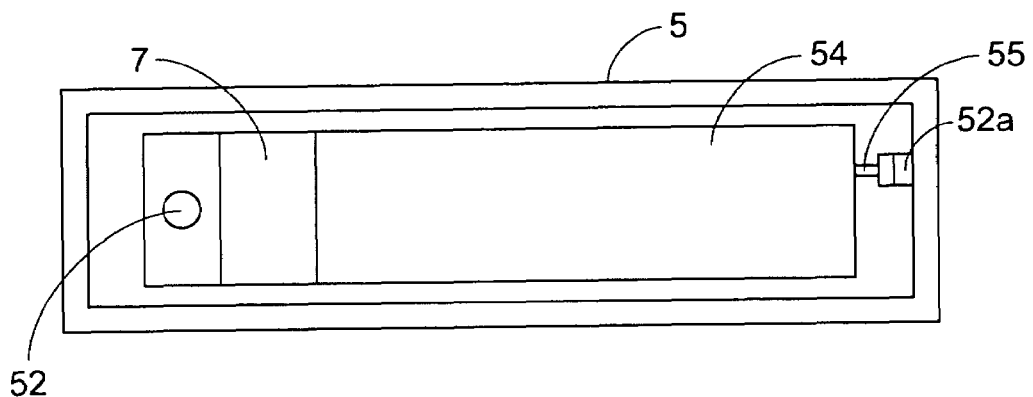
Figure 4C:
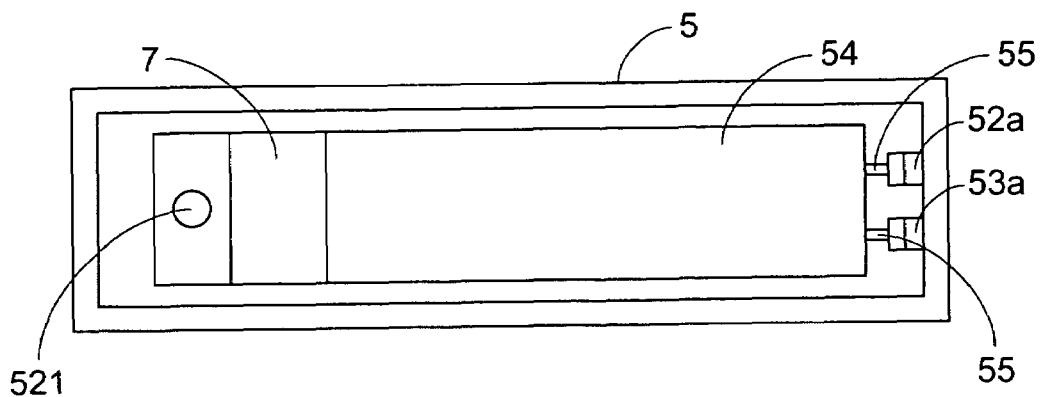

FIGS. 4A~4C are schematic diagrams showing three preferred embodiments of power-transmitting method for providing the wireless carriage module of the flatbed image scanner with power according to the present invention. In these schematic diagrams, the size of the carriage module 54 is enlarged to explain the structure of the power-transmitting medium and does not agree with the exact proportion. In FIG. 4A, the power-transmitting medium includes two conductive rods 52 and 53 penetrating the carriage module 54 as described in the preceding paragraph with reference to FIG. 3A. In another embodiment as shown in FIG. 4B, the power-transmitting medium includes a conductive rod 52 and a conductive plate 52a extending along the moving direction of the carriage module 54. The conductive rod 52 and the conductive plate 52a are arranged at opposite sides of the carriage module 54. When the flatbed image scanner 5 is powered on, there is voltage difference between the conductive rod 52 and the conductive plate 52a so as to provide electricity for the carriage module 54 and the wireless transmitter 7. An elastic conductor piece 55 may be provided to interface between the conductive plate 52a and the carriage module 54 for stabilizing the movement of the carriage module 54 and avoiding abrasion of the conductive plate 53a due to the movement of the carriage module 54 along the conductive rod 52. In an alternative embodiment, the power-transmitting medium includes two conductive plates 52a and 53a fixed to the casing and extending along the moving direction of the carriage module 54 as shown in FIG. 4C. The two conductive plates 52a and 53a have therebetween voltage difference when the flatbed image scanner 5 is powered on so as to provide electricity for the carriage module 54. There is no electricity passing through the rod 521, and the rod 521 only serves as a tracking rail of the carriage module 54. Two elastic conductor pieces 55 may be provided to interface between the carriage module 54 and the two conductive plates 52a and 53a, respectively, for stabilizing the movement of the carriage module 54 and avoiding abrasion between the carriage module 54 and the conductive plates 52a and 53a. The conductive plates 52a and 53a may be arranged at the inner bottom of the casing, the same inner side wall of the casing, or opposite inner side walls of the casing according to the designer's options and considerations. The elastic conductor pieces 55 can be implemented with resilient pieces or wires.

Figure 5A:
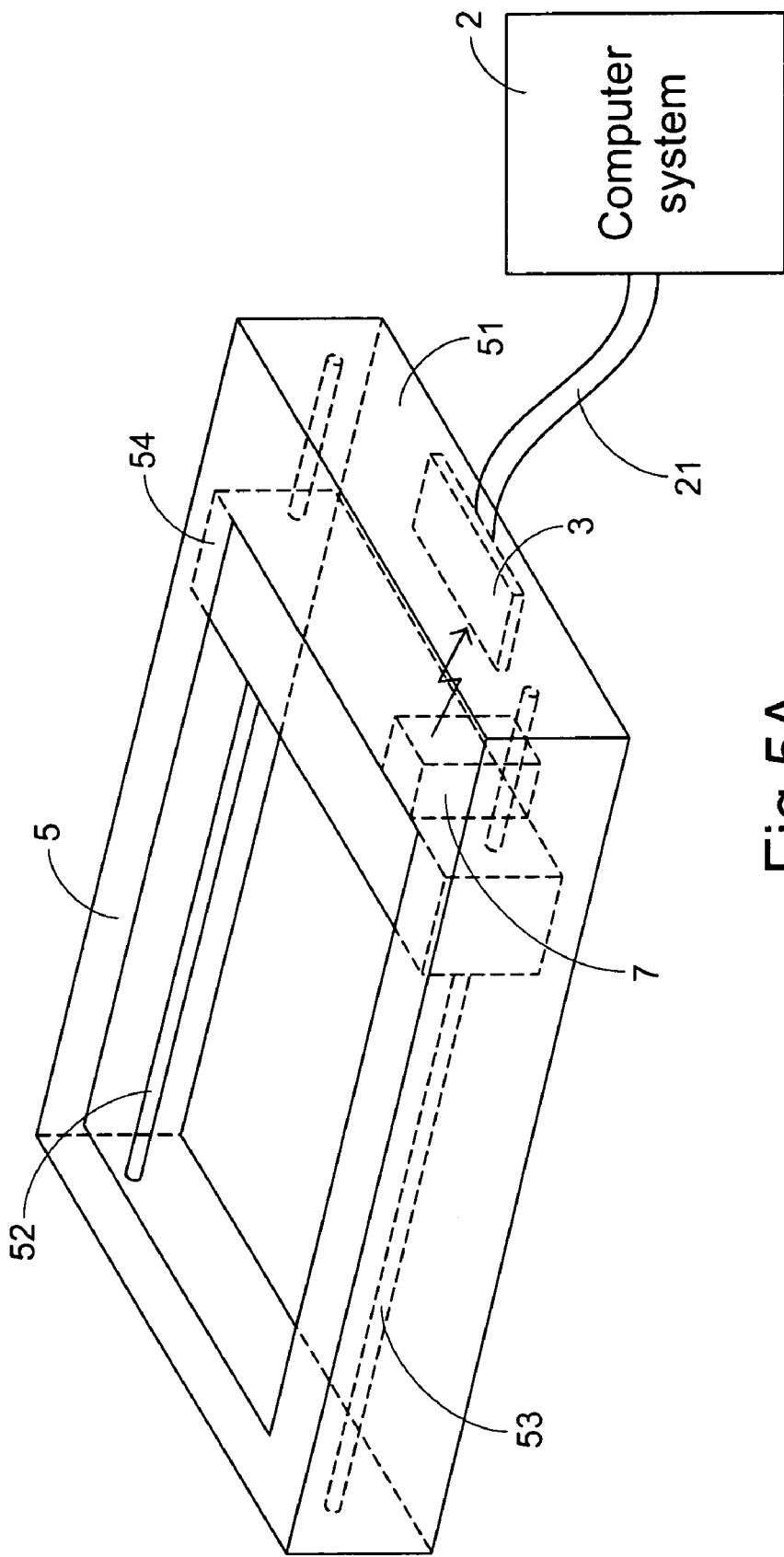
FIGS. 5A and 5B are perspective diagrams showing further preferred embodiments of a flatbed image scanner according to the present invention.
Figure 5B:
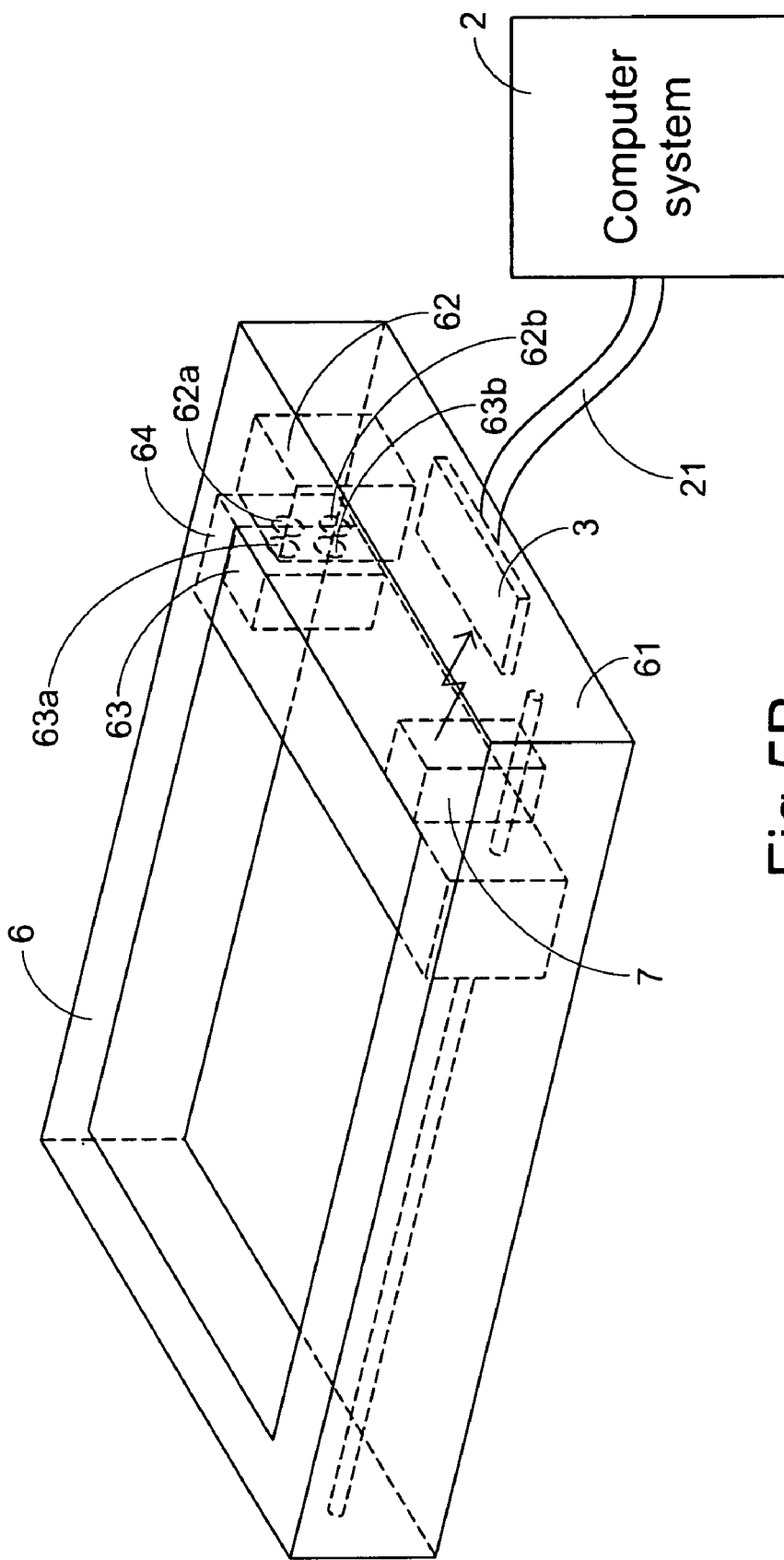

Please refer to FIGS. 5A and 5B which are perspective diagrams showing further preferred embodiments of a flatbed image scanner according to the present invention. In these embodiments, the wireless receiver 3 is respectively disposed in the casings 51 and 61 of the flatbed image scanners 5 and 6. The wireless receiver 3 is in communication with the computer 2 via a cable 21. No flat flexible cable is required in the flatbed image scanner containing therein the wireless transmitter 7 and the wireless receiver 3.

Alternatively, the wireless transmitter 7 and the wireless receiver 3 can be implemented with two wireless transceivers. As described above, the transmission is performed by the way that the first wireless transceiver substituted for the wireless transmitter 7 will convert the digital data from the carriage module into wireless signals (modulated digital data) and transmits them out, and than the second wireless transceiver substituted for the wireless receiver 3 receives the wireless signals (modulated digital data) and converted them into the digital data for further processing by the computer system 2. In this embodiment, an additional transmission is performed in the following steps. At first, the computer system 2 outputs a control signal to the second wireless transceiver. The second wireless transceiver converts the control signal into a wireless signal (modulated control signal) and transmits it out. Then the first wireless transceiver receives and demodulates the wireless signal (modulated control signal) into the control signal for controlling the scanning operation of the carriage module. The bidirectional transmission implemented by adopting wireless transceivers makes the image scanner more powerful.

As described above, the image scanner including a wireless carriage module according to the present invention can eliminate the physical connection to the carriage module via the flat flexible cable. Therefore, the structure is helpful to miniaturize the image scanner to cater for the current trend.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner for scanning an object to obtain digital data, comprising:
   a casing;
   a carriage module slidably disposed inside said casing for picking up image data of said object and converting said image data into digital data;
   a wireless transmitter incorporated into said carriage module for receiving and modulating said digital data into wireless signals and transmitting said wireless signals; and a wireless receiver separate from said carriage module and being in communication with a processing system for receiving and demodulating said wireless signals from said wireless transmitter into said digital data and outputting said digital data to said processing system for further processing; and two conductive rods extending in parallel along a moving direction of said carriage module and penetrating through said carriage module, said carriage module electrically coupled to the two conductive rods such that the carriage module is enabled to be powered by means of a voltage difference between the two conductive rods.

2. The image scanner according to claim 1 wherein said image scanner is a sheetfed image scanner.

3. The image scanner according to claim 1 wherein said image scanner is a flatbed image scanner.

4. The image scanner according to claim 1 wherein said wireless transmitter and said wireless receiver comply with a wireless access protocol selected from the group consisting of Bluetooth, IEEE 802.11b and IrDA.

5. The image scanner according to claim 1 wherein said wireless receiver is separate from said casing of said image scanner and in communication with said processing system via a universal serial bus (USB) cable or an IEEE 1394 bus cable.

6. The image scanner according to claim 1 wherein said wireless receiver is mounted inside said casing of said image scanner and in communication with said processing system via a universal serial bus (USB) cable or an IEEE 1394 bus cable.

7. The image scanner according to claim 1 wherein said wireless transmitter and said wireless receiver are implemented with two wireless transceivers.

8. An image scanner for scanning an object to obtain digital data, comprising:
    a casing;
    a carriage module slidably disposed inside said casing for picking up image data of said object and converting said image data into digital data;
    a wireless transmitter incorporated into said carriage module for receiving and modulating said digital data into wireless signals and transmitting said wireless signals; and
    a wireless receiver separate from said carriage module and being in communication with a processing system for receiving and demodulating said wireless signals from said wireless transmitter into said digital data and outputting said digital data to said processing system for further processing; and
    two conductive plates fixed to said casing and extending along a moving direction of said carriage module, said two conductive plates having therebetween voltage difference so as to provide electricity for said carriage module, said carriage module being in electrical contact with the two conductive plates.

9. The image scanner according to claim 8, further comprising two elastic conductor pieces interfacing between said two conductive plates and said carriage module, respectively, for stabilizing movement of said carriage module and avoiding abrasion of said two conductive plates.

10. The image scanner according to claim 8 wherein said two conductive plates are arranged at an inner bottom of said casing.

11. The image scanner according to claim 8 wherein said two conductive plates are arranged at the same inner side wall of said casing.

12. The image scanner according to claim 8 wherein said two conductive plates are arranged at opposite inner side walls of said casing.

13. An image scanner for scanning an object to obtain digital data, comprising:
    a casing;
    a carriage module slidably disposed inside said casing for picking up image data of said object and converting said image data into digital data;
    a wireless transmitter incorporated into said carriage module for receiving and modulating said digital data into wireless signals and transmitting said wireless signals; and
    a wireless receiver separate from said carriage module and being in communication with a processing system for receiving and demodulating said wireless signals from said wireless transmitter into said digital data and outputting said digital data to said processing system for further processing; and
    a conductive rod and a conductive plate extending along a moving direction of said carriage module and arranged at opposite sides of said carriage module, and there is voltage difference between said conductive rod and said conductive plate so as to provide electricity for said carriage module.

14. The image scanner according to claim 13 wherein said carriage module slidably engages with said conductive rod in a manner that said carriage module keeps in electric contact with said conductive plate while moving along said conductive rod.

15. The image scanner according to claim 13 further comprising an elastic conductor piece interfacing between said conductive plate and said carriage module for stabilizing movement of said carriage module and avoiding abrasion of said conductive plate.

16. An image scanner for scanning an object to obtain digital data, comprising:
    a casing;
    a carriage module slidably disposed inside said casing and movable between a standby position and a plurality of scanning positions for picking up image data of said object and converting said image data into digital data;
    a wireless transmitter incorporated into said carriage module for receiving and modulating said digital data into wireless signals and transmitting said wireless signals;
    a wireless receiver separate from said carriage module and being in communication with a processing system for receiving and demodulating said wireless signals from said wireless transmitter into said digital data and outputting said digital data to said processing system for further processing; and
    a power supply for supplying said carriage module with power comprising
    a battery device coupled to and moving with said carriage module for providing electricity for said carriage module and having first exposed contacts; and
    a charging device fixed on an inner wall of said casing and having second exposed contacts, wherein said first exposed contacts of said battery device are positioned such that they contact said second exposed contacts of said charging device when said carriage module is in the standby position so as to be enabled to receive electricity from said charging device when said image scanner is powered on.

* * * * *